Patented Mar. 13, 1934

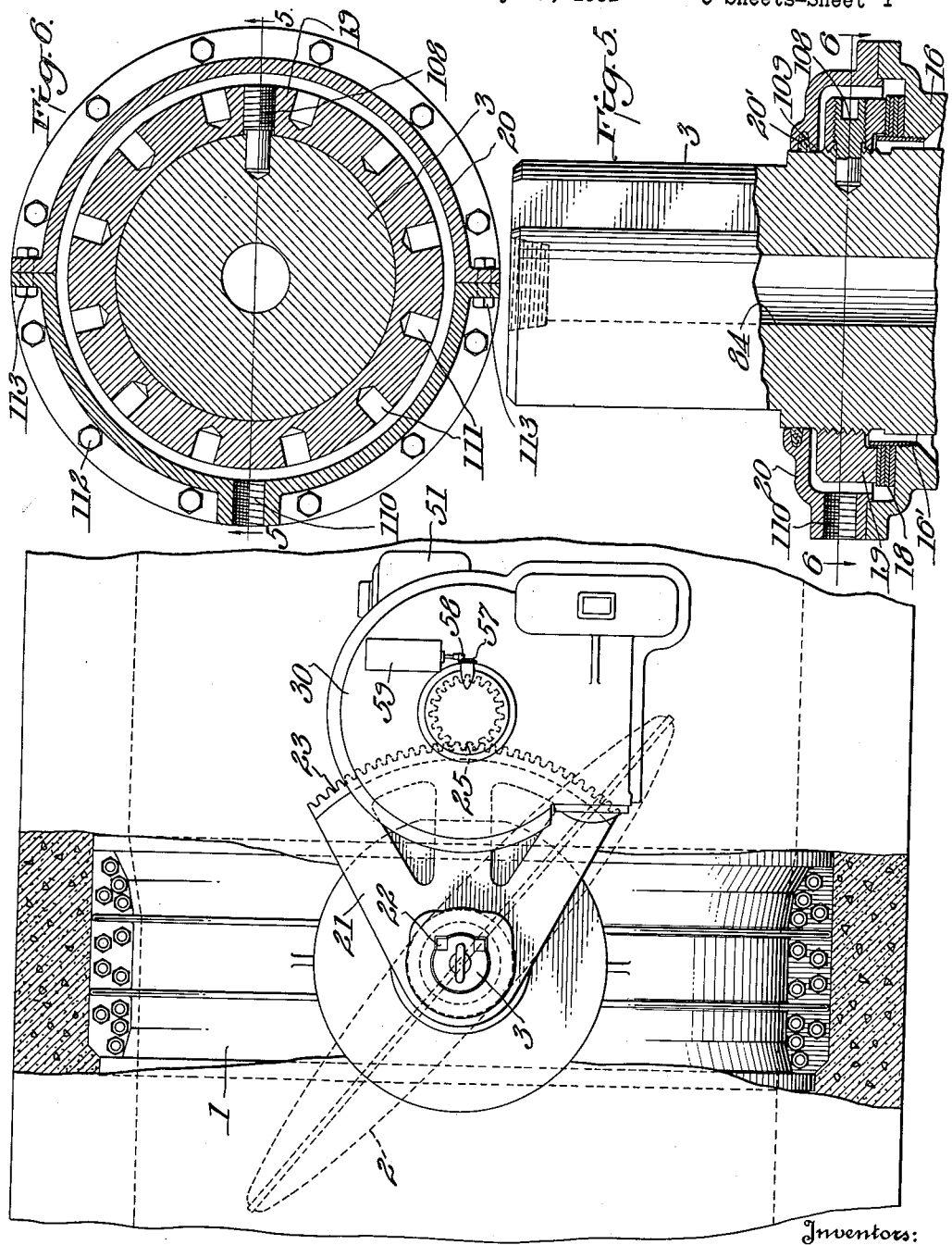

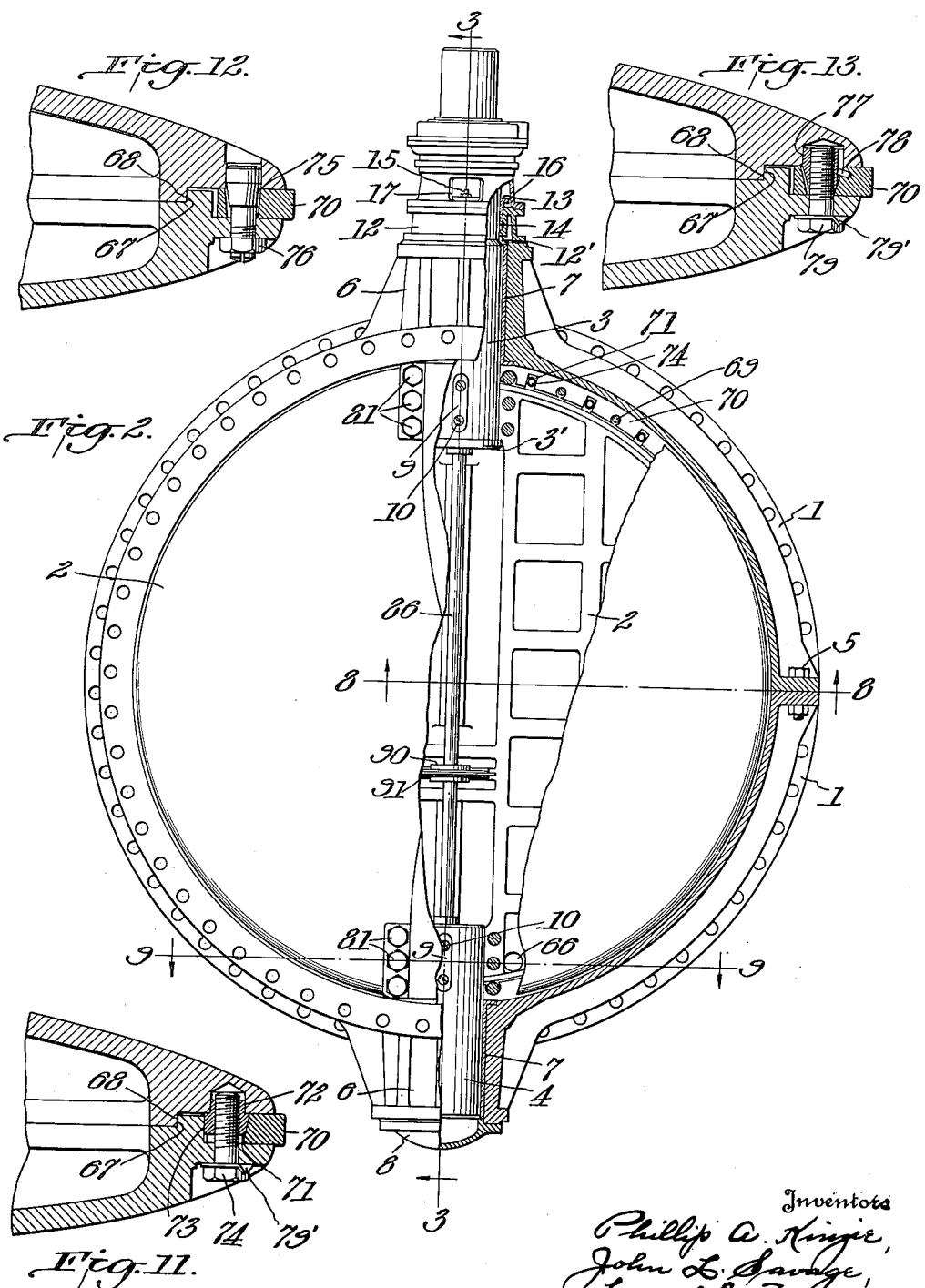

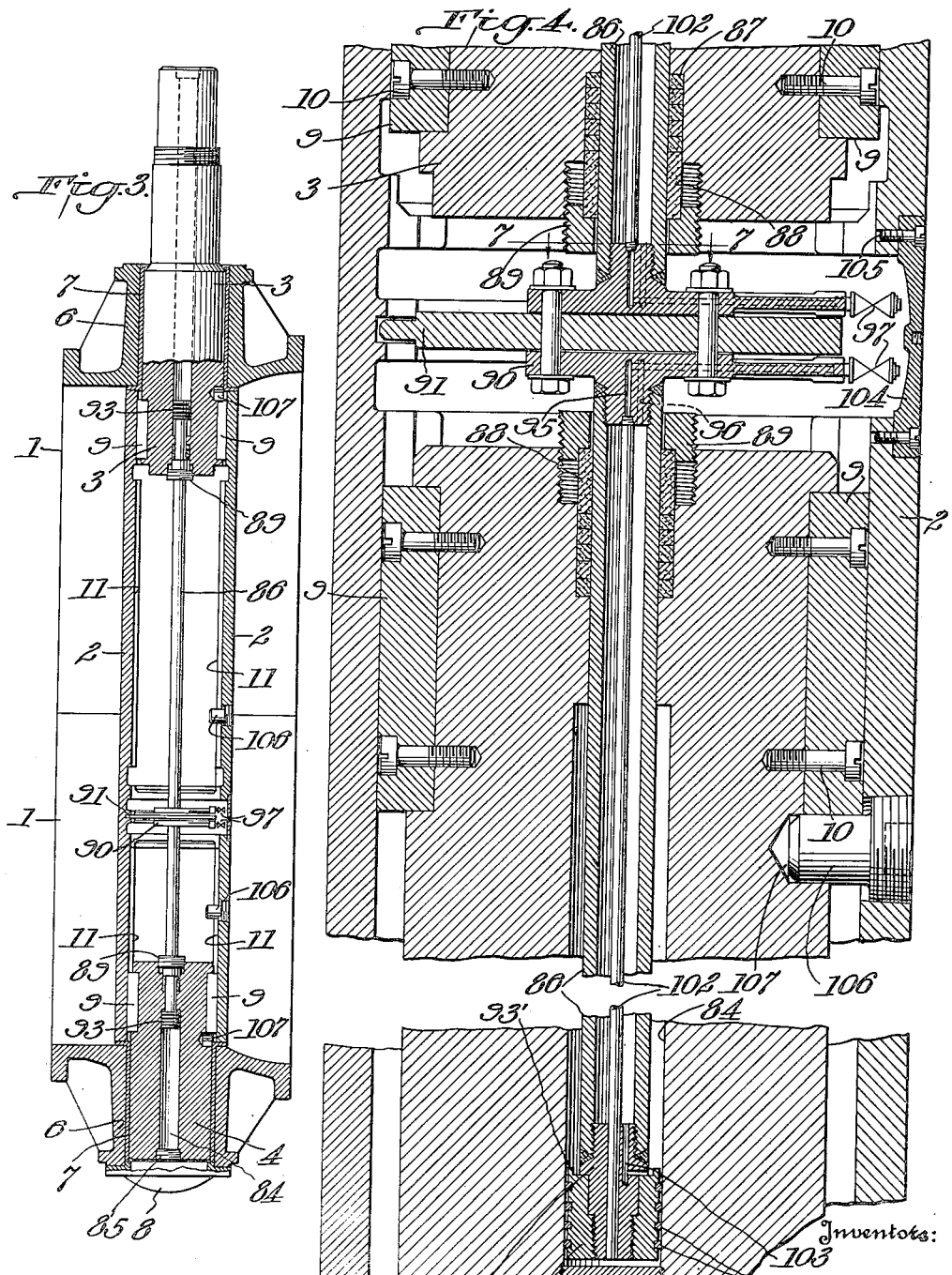

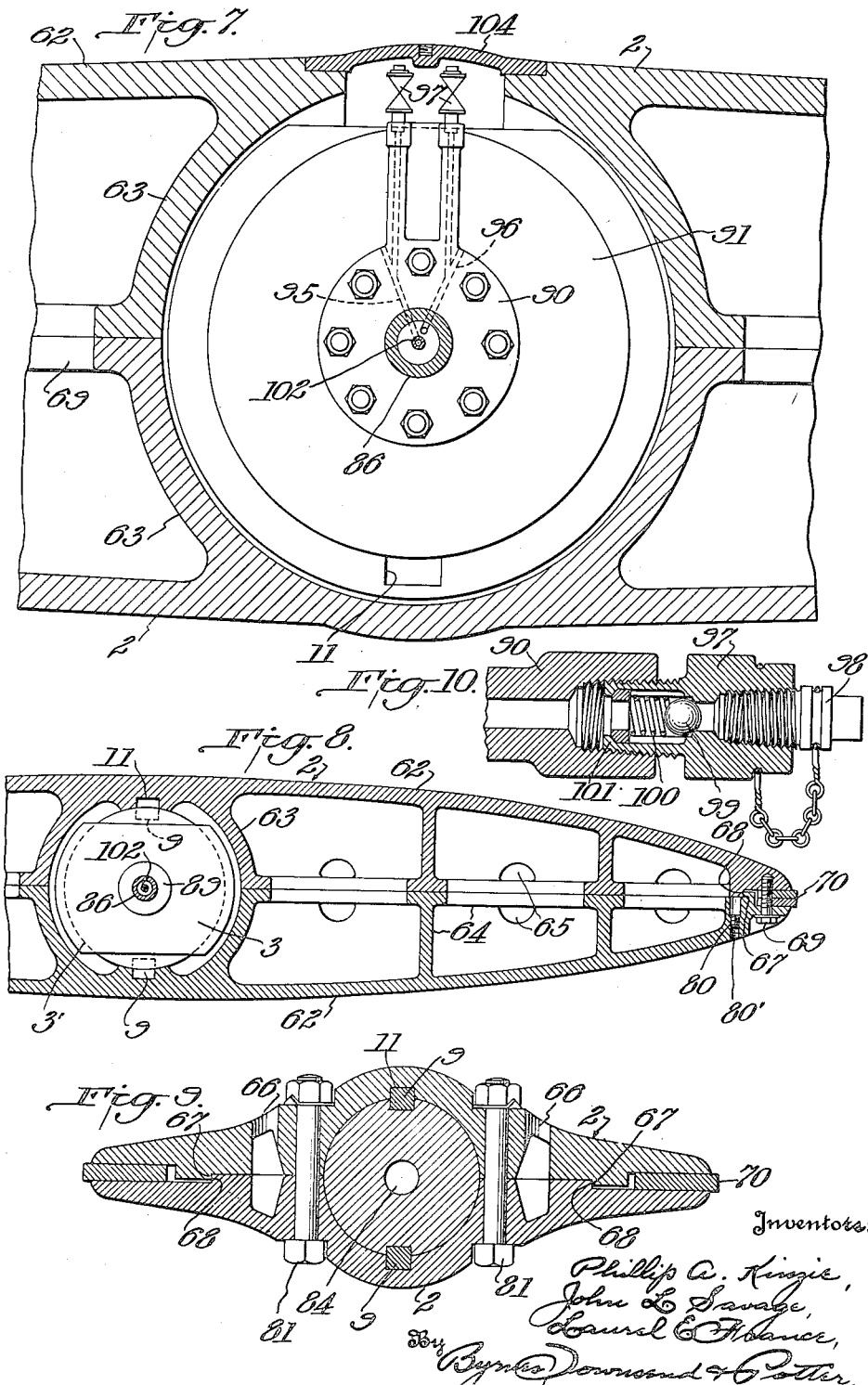

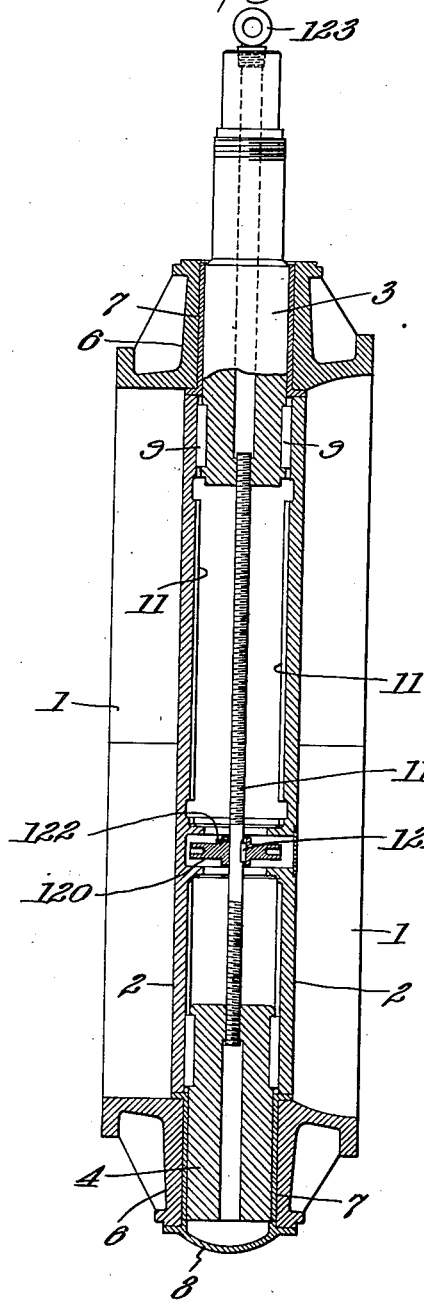
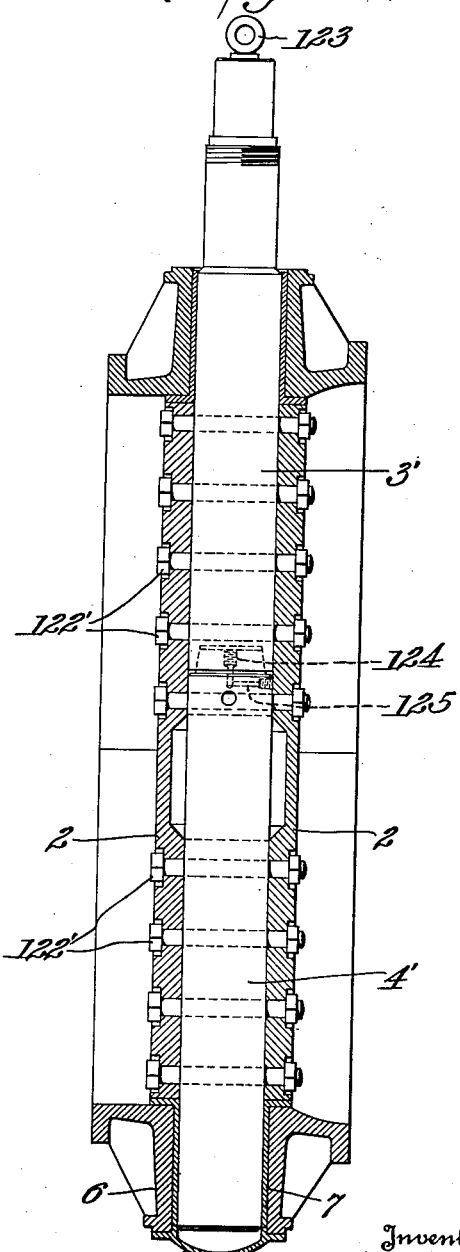

1,951,283

UNITED STATES PATENT OFFICE 1,951,283

BUTTERFLY VALVE

Phillip A. Kinzie, John L. Savage, and Laurel E. France, Denver, Colo., assignors to Universal Hydraulic Corporation, Denver, Colo., a corporation of Colorado Application July 17, 1931, Serial No. 551,524

15 Claims. (Cl. 251—11)

This invention relates to valves and more particularly to butterfly valve, i. e., to the damper, disk or leaf valves such as are used to control the flow of fluid within or through conduits or orifices whose shapes are circular, square or rectangular when taken in section at right angles to the line of fluid flow.

The larger sizes of butterfly valves might be used, for example, to stop the flow of water in a penstock leading to a turbine, as an emergency gate to stop the flow of water in a conduit leading to a needle valve, as a combined stop and flow control valve in a city water main, or to control the discharge of water from a conduit into the atmosphere at a point below the valve. While these specific applications are noted as illustrative of some of the uses to which a valve such as contemplated by this invention may be applied, it is to be understood that it may readily be used for many other purposes with equal advantage and economy.

The installation, inspection and repair of the movable elements of such butterfly valves in large conduits have presented problems which have been solved, in general, by the construction of lateral passageways in the concrete or other material forming the conduit or orifice to permit access to the valve and/or removal and replacement of parts. While this expedient is usually satisfactory, it is always objectionable from the standpoint of economy and it imposes another requirement upon the general structural assembly which may lead to additional expense by necessitating a particular location for one or more parts of the system.

An object of the present invention is to provide a butterfly valve in which the working parts are so constructed and related that the moving elements which control and regulate the flow of fluid within a closed conduit or through an orifice can be assembled and installed or dismantled and removed through the conduit, without necessitating the removal of a part of the controlled conduit or the breakng of its continuity. Another object is to provide a butterfly valve in which all parts other than the valve body or casing may be assembled and installed, inspected or dismantled and removed either from and through the conduit or from the control room in which the valve operating mechanism is located. A further object is to provide a butterfly valve having an operating stem whose opposite ends are mounted in bearings forming part of a conduit which is embedded in concrete or otherwise buried or covered, and in which the parts of the valve are so related that the conduit itself provides access to the stem bearing at the end of the stem remote from that to which the operating mechanism is connected. A further object is to provide a butterfly valve including sealing elements at the periphery of the valve, and devices which may be adjusted manually from the dry side of the leaf, when the valve is in closed position, to bring the sealing elements into fluid-tight engagement with the valve casing or seat, thus avoiding the necessity for extremely accurate machine work prior to the assembly and installation of the valve. More specifically, an object is to provide a butterfly valve including sealing elements which may be adjusted outwardly for fluid-tight engagement with the valve casing or withdrawn to make the overall dimensions of the leaf somewhat less than that of the conduit in which it is installed, and including a stem which may be collapsed within or withdrawn from the leaf to permit entrance of the leaf into or its removal from and through the conduit.

These and other objects of the invention will be apparent from the following specification, when taken with the accompanying drawings, in which, Fig. 1 is a plan view of a butterfly valve embodying the invention, as seen from above the floor of the control room, and with parts broken away to illustrate the valve casing, Fig. 2 is an elevation of the casing and valve, as seen when looking axially along the line of fluid flow, and with parts broken away, Fig. 3 is a central vertical section on line 3—3 of Fig. 2, Fig. 4 is an enlarged fragmentary view of the valve stem, similar to Fig. 3, but showing the ends of the stem retracted, Fig. 5 is an enlarged sectional view through the upper stem and the bearing which carries the weight of the valve, as taken on line 5—5 of Fig. 6, Fig. 6 is a horizontal sectional view of the upper stem and bearing as taken on line 6—6 of Fig. 5, Fig. 7 is a fragmentary horizontal section through the leaf taken on line 7—7 of Fig. 4, Fig. 8 is a fragmentary horizontal section taken on line 8—8 of Fig. 2, Fig. 9 is a horizontal section through the leaf taken on line 9—9 of Fig. 2, Fig. 10 is a fragmentary section through the end of one of the hydraulic jack lines, Fig. 11 is an enlarged section through the edge of the leaf and showing the preferred form of ring seat adjusting mechanism, Figs. 12 and 13 are similar sections illustrating other forms of adjusting mechanism, and Figs. 14 and 15 are vertical central sections through embodiments of the invention which employ other arrangements for retracting the stem within or withdrawing the same from the leaf.

In the drawings which illustrate the invention as embodied in valves for use in conduits of circular cross-section, the reference numeral 1 identifies the valve body or cylindrical casing in which the valve leaf 2 is pivotally supported by an upper stem 3 and a lower stem 4. The casing has the same interior diameter, on the inflow side of the leaf 2, as that of the conduit conveying fluid to the valve, while on the outflow side of the leaf the interior diameter of the casing and fluid passage is increased somewhat to permit the withdrawal or installation of the valve leaf 2 from within the conduit. It is to be understood, however, that this relative arrangement may be reversed whenever individual conditions of installation and economic demands make it desirable to have the larger diameter of conduit upon the inlet side of the valve.

The casing 1 is composed of two identical castings made from the same pattern with their mating surfaces of jointure upon the horizontal center line of the valve and conduit where flanges are provided to receive bolts 5 which fasten the upper and lower halves of casing 1 together. Each half of casing 1 is provided with a heavily ribbed and braced stem bearing boss 6 which is bored out to receive and rigidly hold anti-corrodible bushings 7 which are also alike and made from the same pattern. These bearing bushings 7 are bored to rotatably receive the upper stem 3 in bushing 7 carried by the upper half of casing 1 and lower stem 4 in bushing 7 carried by lower half of casing 1.

The lower extremity of boss 6 on the under side of the bottom half of casing 1 is covered and protected by the domed head bearing cap 8 which is tightly bolted against the finished end face of boss 6 and so closes off the opening or bore of 7.

Upper stem 3 and lower stem 4 are provided with inset or embedded keys 9 which are retained in their respective positions in the stems by the screws 10, and slidingly engage mating keyways 11 machined axially throughout the full length of the bore in leaf 2 which receives upper stem 3 and lower stem 4; this construction causes leaf 2, upper stem 3 and lower stem 4 to act in unison with respect to rotation of the several parts, and at the same time permits the stems to be moved axially with reference to the stem bore in the leaf 2 by means of the hydraulic jacking equipment.

Upper stem 3 is reduced somewhat in diameter for a portion of its length immediately above the upper end of bearing bushing 7, and is here encased within and extends through a stuffing-box formed in the casting 12 and the gland 13, which compresses the packing 14 to insure fluid-tightness by means of studs 15. The stuffing-box containing packing 14 is formed as an integral part of the casting 12, whose lower flanged face is bolted to the upper finished face of bearing boss 6, and is centralized with respect to the axis of the stem 3 and the bore of boss 6 by shouldered ribs 12' which are turned to fit said bore. Casting 12 extends upwards from the flange bolted to 6, and is provided with a flanged and shouldered face to which the matingly flanged and counter-bored lower flange face of casting 16 is fitted and bolted fast, and is thus in turn centralized with respect to the axis of the valve. Casting 16 is provided with hand-holes 17 through its walls on opposite sides which give access to the stuffing-box and gland 13, and continuing upwards terminates in a heavy machined face to receive the laminated thrust washers 18, upon which the entire weight of the rotating parts attached to the stem 3 of the valve is suspended by the thrust nut 19 which, threadably mounted upon the stem 3, transmits the suspended weight to the thrust washers 18, which in turn are carried by casting 16 resting upon 12 which rests upon the flanged face of boss 6. Thrust nut 19 as before stated is threadably mounted upon stem 3 and is thus made adjustable with respect to stem 3 and thrust washers 18 whereby the valve disk 2 may be suspended and centralized with respect to the seat bore in casing 1 by means provided for that purpose, as will be presently described.

An oil reservoir or basin is provided around thrust washers 18 by the circular wall of casting 16 which extends upwards slightly above the top of the upper thrust washers 18 and a tubular sleeve 16', Fig. 5, which is threaded to casting 16 and extends above the upper thrust washer between stem 3 and the inner circumference of thrust washers 18. A bearing cap 20 is provided with a turned shoulder on the under side of its flange face which closely fits a mating counter-bore in the upper flange face of casting 16, and is thereby held centralized with the axis of the stem 3. The bearing cap 20 is made dust and oil-tight by a closely-fitting bore surrounding stem 3 with a turned groove in said bore adapted to receive felt packing 20' which is in contact with the polished surface of the stem.

Bearing cap 20 is split upon its vertical axis, as shown in Fig. 6, the mating halves being flanged and bolted thus permitting the removal of cap 20 without disturbing gear segment 21, and so making thrust collar 19 easily accessible for inspection and adjustment by means which will later be described. Stem 3 is again reduced in diameter above bearing cap 20 and is extended upwards sufficiently to take the hub of the driving-gear segment 21, which is keyed fast to stem 3 by the twin keys 22. The segmental periphery of 21 is provided with gear teeth 23 which engage the matingly toothed pinion 25 that is operated, through reduction gears housed in a casing 30, by an electric motor 51. The reduction gears, not shown, are so designed that a relatively small power input at the motor produces a slow but greatly magnified turning force upon the stem 3 and we prevent overtravel of the gear segment 21 at either end of its limits of travel by bevel gears 57, 58 which are operated from the shaft carrying pinion 25 to drive a limit switch 59. It will be understood that the mechanism for operating the valve forms no part of the present invention, and that hydraulic or other appropriate or convenient mechanism may be used in place of the electrically operated control apparatus.

Reverting now to the structure of the valve leaf or disk 2, the general form of the leaf is lenticular and it is made up of two parts whose mating faces fall on a plane passing through the center line of the stems 3 and 4. Each half of the leaf 2 has a convex outer wall or shell 62, which merges into the approximately semi-circular wall 63 which bears against stems 3, 4 when the leaf is assembled, and a network of internal ribs 64 which meet at the central plane of the leaf to provide a cellular reinforcement, the horizontal ribs being apertured, as indicated at 85, to permit water to pass to the bottom of the leaf where the lower cells are open to the exterior of the leaf, through ports 66. The leaf sections are provided, adjacent the periphery of the leaf, with cooperating cylindrical shoulders 67, 68 which hold the sections concentric with each other, and a row of cap screws 69 pass through the rim of the outflow side of the leaf and into the other section to hold the parts in engagement.

This shouldered interlock is a very important feature of the valve, inasmuch as it, by reason of its relatively great circumferential length around the periphery of the leaf, presents a large area of metal which is effective in shear, and thus causes the two component parts (halves) of the leaf to act as a single unit in resisting the water load applied thereto.

Around the periphery of the assembled disk 2 a deep rectangular seat groove is machined to receive the bronze ring 70, the width or thickness of which is made such that after the seat ring 70 has been brought into tightly seating adjustment with the seat bore in casing 1, by means which will be presently described, tightening of the equally spaced cap screws 69 around the circumference of disk 2 will pull the mating halves of disk 2 which form the sides of the slot containing ring 70 into clamping engagement against the opposing side faces of ring 70 and so maintain it in its adjusted position with reference to leaf 2, and to the seat bore in casing 1.

The holes in ring 70, through which clamping bolts 69 extend, are of larger diameter than the bolts so that the ring can be adjusted radially, and the clearance so provided in these holes is shown in Fig. 2. Ring 70 does not constitute a complete circle, inasmuch as a gap must be provided to permit stems 3 and 4 to extend beyond the disk into bushings 7, consequently the ring 70 is made in two sections each of which resembles the letter C, with their opposing ends spaced apart by the distance representing the diameters of stems 3 and 4, and in valves of the larger sizes, these two mating parts are subdivided into two units by stepped joints located upon the horizontal center line of the valve, as shown in Fig. 8, while in valves of the largest sizes, similar stepped joints are spaced midway between those on the horizontal center line and the ends of ring sections adjacent to the stems.

As shown in Figs. 2 and 11, a series of wedges are provided for forcing the ring 70 outward and into fluid-tight engagement with the bore of the casing 1. The wedge blocks 71, of bronze or other corrosion resistant metal, are of generally rectangular form with cylindrical extensions 72 that are slidably received, with a slight clearance, within blind holes formed in the rim of the upstream section of the leaf 2. The inner face of each block 71 is flat and rests upon and is solidly supported by the bottom 73 of the ring groove, while the outer face is tapered or inclined and bears against a similarly inclined surface formed at the bottom of a rectangular slot cut in the inner periphery of the ring 70. The adjusting screws 74 are preferably identical with the cap screws 69 and pass through openings in the rim of the downstream section of leaf 2 to engage the threaded bores of the wedge blocks 71. As shown in Fig. 2, the adjusting blocks alternate with the clamping screw 69, and the slots in the seat ring 70 have a peripheral width somewhat greater than that of the wedge blocks, the clearance so provided permitting greater freedom in the radially expanding and contracting movement of ring 70 when adjustments are being made.

While this type of adjusting wedge is to be preferred since the reaction from the wedging action is carried directly into the leaf by compression, the constructions shown in Figs. 12 and 13 are also useful. As shown in Fig. 12, the movable wedge comprises the tapered section of the enlarged head of a screw 75 which is slidable in alined bores in the leaf sections. The outer end of the screw has a kerf or sawcut in which a screw driver may be inserted to hold the screw when the nut 76 is turned to force the ring 70 outward. This construction requires the formation of openings at the inflow side of the leaf, and when this is objectionable, the arrangement shown in Fig. 13 may be used. The wedge in this case comprises a threaded bushing 77 which is slidable in a blind hole formed in the inflow section of the leaf 2, and has a tapered surface bearing against a similar surface on the ring 70. A pin 78 on ring 70 enters a groove in the bushing 77 to prevent rotation of the latter when the cap screw 79 is rotated to adjust the ring 70.

To adjust the seat ring 70, the valve is moved to closed position by the operating mechanism, and the cap screws 69 at the outflow face of the valve leaf are loosened. The wedges are then adjusted, by turning the appropriate screws or nuts, to move the ring 70 radially. The adjustment is made progressively around the circumference of the leaf 2, and each screw or nut is tightened a little at a time, the operation being repeated until the ring 70 fits snugly against the casing 1 around the entire periphery of the valve.

When the adjustment has been completed, the cap screws 69 are tightened to clamp the ring 70 between the opposed faces of the sections of the leaf 2. Some form of locking device is preferably employed to hold the cap screws 69 and 74 or 79 against rotation, such for example as rectangular washers 79', of copper or brass plate, which may be bent, after the cap screws are tightened, to bring a corner of the washer against the hexagonal face of the screw head.

Referring to Fig. 2, it will be seen that the holes in seat ring 70 through which the cap screws 69 pass are slotted through to the inner periphery of the ring, the slots being too narrow to permit the ring to move out of the ring groove, thus preventing fluid under high velocity from stripping the ring from the groove in the event that the clamp screws are not properly tightened. The slotting of the ring at the cap screw holes, as well as the slots which receive the wedge blocks 71, adds to the radial flexibility of the ring and facilitates its adjustment to the seat bore of casting 1.

To aid in dismantling the valve leaf, a series of threaded bores 80 are provided in the outflow leaf section, Fig. 8, and cap screws 68 or adjusting screws 74 may be inserted in these bores to serve as push-off bolts; the bores being normally closed by bronze plugs 80' which protect the threads against corrosion.

At the upper and lower limits of the gate leaf and adjacent to either side of the upper and lower stems, we provide the bolts 81, Figs. 2 and 9, which tie the two halves of the leaf together against the localized reactions where the water load imposed upon the leaf is transferred to the stems 3 and 4.

All valves with which we are familiar, of the general type as herein described, require the removal of either a section of the valve casing or of a portion of the conduit adjacent thereto, to permit the installation or withdrawal of their leafs or disks, which in turn entails apertures within the mass of the material comprising the structures in which they are embedded to permit such installation or withdrawal, likewise passageways must be provided, giving access to their stem bearings opposite to those adjacent to their operating mechanisms. Under these conditions, when such valves are placed in the base of a dam, or in a tunnel far below ground level, problems of installation, servicing and removal are presented which are difficult to solve and are always costly, from not only the monetary standpoint, but also from that of the ultimate economy of use of the entire structure or works of which they have become a part, due to the serious weakening effect upon the structure produced by the presence of these apertures and passageways which prevent its mass from acting in continuity.

In the valves of our invention these deleterious and costly factors are eliminated for the stems are drawn into the leaf, the seat ring loosened and contracted, and the leaf, stems, seat ring and all appurtenant parts are withdrawn through the conduit to the inlet or outlet end as conditions of each individual installation dictate, leaving the conduit undisturbed and in unbroken continuity.

As shown in Figs. 2, 3 and 4, the mechanism for collapsing or withdrawing stems 3, 4 into the valve leaf comprises hydraulic jacks which are of similar construction but which provide for a greater travel of the longer stem 3. Referring to Fig. 4, it will be seen that the stem 4 has a central bore or hydraulic cylinder 84 which is closed at the lower end by a plug 85, and the upper reduced diameter section of the bore has a sliding fit on the hollow piston rod 86, a fluid-tight joint being provided by the packing 87 which is compressed by the gland 88 and follower 89. The upper end of the hollow piston rod 86 is threaded and welded to a boss on the header plate 90, bolted to a diaphragm plate 91 that has its periphery seated in a circumferential groove formed in the valve leaf 2. The lower end of the tube 86 is similarly threaded and welded to a bushing 92 to which a piston 93 is secured, the piston carrying packing rings 94 that engage the polished wall of the hydraulic cylinder 84. The header plate 90 is provided with two passages 95, 96 which are closed at their outer ends by valved fittings 97 which may be and preferably are of the type shown in Fig. 10. Each fitting 97 has an outer bore threaded to receive the nozzle tip of a high pressure grease or oil pump, not shown, and this bore is normally closed by a removable plug 98. A check valve 99 and its spring 100 are retained within the fitting by an inturned flange 101, the ball valve being so located that it will be moved from its seat by the projecting split tip of the grease pump nozzle.

A pipe 102 is threaded into the inner end of passage 95 of the header plate and extends axially of the hollow piston rod 86 and through the bushing 93 and piston 94. Passage 96 opens into the interior of the piston rod or tube 86, and bushing 93 has a passage 103 which affords communication between the piston tube and the bore 84, the passage opening into the bore above the piston 93 which has lugs 93' at its upper face upon which the stem 4 rests when it is in lowered position, thus insuring that the outlet end of passage 103 will remain open to discharge oil into cylinder 84 in the retracting cycle of operations.

Access to the valved fitting 97 is provided by a handhole cover 104 which is secured in place on the outflow section of valve leaf 2 by screws 105. Retainer plugs 106 are threaded into the same section of leaf 2, and in position to engage within recesses 107 in stems 3, 4 when the stems are fully retracted.

As stated above, the hydraulic jack mechanism for stem 3 is similar to that for stem 4, differing only in that it provides for a greater axial movement of stem 3. The component parts of the stem 3 jack system are therefore identified by like reference numerals but will not be described in detail.

To withdraw the stem 4 from its operating position, as shown in Fig. 3, to a position within the valve leaf, Fig. 4, the clamping mechanism for the seat ring 70 is loosened so that the ring is no longer forced against the bored seat in casing 1; the leaf clamping bolts 81 adjacent the stems are loosened, and push-off bolts are inserted in bores 80 to force the leaf sections apart by a small amount to free the stems 3 and 4. Retainer plugs 106 are removed, and the handhole cover 104 is removed to give access to the fittings 97. The outlet nozzle of a manually operated grease pump is connected to the fitting of passage 96 and the inlet nozzle is connected to the fitting of passage 95. Upon operating the pump, oil is forced into the bore 84 of stem 4 through passage 96, and the oil displaced from below the piston 93 passes out through pipe 102 and passage 95 to the grease pump. When the stem 4 is fully retracted, as shown in Fig. 4, the retainer plug 106 is replaced, entering recess 107 in stem 4 to lock the same against accidental displacement in the event of a failure in the hydraulic jack system. Upon removing grease pump connections, the plugs 98 are replaced in fittings 97 to prevent leakage of oil past the check valves 99.

The pump connections are transferred to the fitting 97 at the upper side of diaphragm 91 and the stem 3 is similarly retracted. The leaf and stems may now be removed as a unit down the conduit to either the inlet or outlet end, as conditions dictate, leaving the conduit undisturbed and in unbroken continuity, and with the strength of the enclosing structure unimpaired.

The operating steps for projecting the stems from the leaf 2 will be obvious from the above description of the method of withdrawing the stems.

When the valve is assembled and functioning, the entire weight of all the moving parts, other than the power-operating mechanism, is suspended upon and carried by the thrust bearing collar 19, Fig. 2. We accomplish this by the following means:

Stem 4 is suspended upon the lower piston 93 which in turn is carried by piston rod 86 which is attached to header plate 90, bolted to diaphragm plate 91 which transfers the weight of all parts just enumerated into the leaf 2. Leaf 2 is suspended upon the shouldered flange 3' on the lower end of upper stem 3, which flange is flattened off on the opposite sides adjacent to keys 9, as shown in Fig. 8, and by this arrangement clears the segmental stem bore within which the keyways 11 are cut in leaf 2, and permits the stem 3 to be retracted into the leaf without interference from said shouldered enlargement. The weight of the leaf 2 and all appurtenant parts is thus carried by upper stem 3 to thrust collar 19 and transferred through thrust washers 18 to the upper casing section 1, in the manner described in the earlier portion of this application.

When the valve is being installed and all the parts have been completely assembled, the weight of all the moving parts of the leaf, stem, etc., will be temporarily concentrated at the lower hub face of the leaf 2, and this hub face will be resting upon the upper flange face of lower stem bushing 7. Now in order that this weight, which in valves of the larger sizes reaches a value of many thousands of pounds, may be lifted off this bushing flange and carried by thrust collar 19, it is essential that a rotational turning effort be applied to collar 19 of a magnitude much greater than can be readily secured through manual effort by use of a conventional wrench.

Reference to Figs. 5 and 6 will show that the thrust collar is locked in place on stem 3 by a lockscrew 108 which is threaded into the collar to project into a recess 109 in the stem. One section of the dust cap 20 is provided with a boss 110 that is threaded to receive lockscrew 108, and the thrust ring 19 has a series of drilled holes 111 for receiving the projecting end of the lockscrew when it is temporarily located in the bore 110 of the collar 20.

When the weight of the assembled leaf structure is carried upon the lower bushing 7, the locking recess 109 in the stem is located below the level of lockscrew bore in thrust collar 19. With the two halves of dust cap 20 removed, the thrust collar 19 is manually rotated in tightening direction as far as it will go, and the section of cap 20 which carries the threaded boss 110 is clamped to casting 16 by bolts 112. The lockscrew 108 is threaded into bore 110 to engage in one of the equally spaced drill holes 111, and the other half of dust cap is bolted in place and clamped to its companion section by bolts 113.

The thrust collar 19 is thus locked against rotation and, upon slowly starting the operating mechanism to turn the stem 3, the thrust collar acts as a screw jack and the stem 3 and leaf 2 are raised and the weight is transferred to collar 19. The threads on collar 19 and stem 3 are relatively coarse and the required axial movement may be secured by an angular movement of stem 3 which is considerably less than the leaf movement between the wide open and fully closed positions. After this adjustment is made, the lockscrew is removed from cap 20, which is dismantled to permit the lockscrew to be inserted in thrust collar 19 to preserve the adjustment of the collar and stem.

In valves falling within the smaller size ranges wherein the weights of the stems to be handled are but moderate, we employ the construction illustrated in Fig. 14, where it will be seen that the hydraulic jacking equipment for moving the upper and lower stems into the retracted and extruded positions has been replaced by a double-acting screw-jack. When utilizing this type of retracting gear, the lower end of stem 3 and the upper end of stem 4 are each tapped to threadedly receive the right and left hand screw stem 119, upon which is mounted the capstan collar 120, which is keyed to the stem by the key 121, and is maintained in its correct position axially of the stem 119 by the set screw 122. Radial holes are drilled into the periphery of collar 120, into which the end of a suitable bar is inserted for turning the screw stem 119, which, being threadedly received within the valve stems, causes them to enter into or extend from the interior of the leaf as desired.

Inasmuch as the upper stem 3 projects farther above the leaf when in its functioning position, than lower stem 4, the pitch of the thread on screw stem 119 which enters into the similarly tapped lower end of stem 3 is made sufficiently more rapid than the pitch of the thread on its lower end which enters stem 4, to compensate for this difference in travel requirements of stems 3 and 4, respectively.

The balance of the construction of the split leaf, seat adjustment, thrust collar suspension, etc., is substantially the same as that previously described. Corresponding parts are identified by the same reference numerals but will not be described in detail.

An alternate form of our valve construction is shown in Fig. 15, in which the halves of the disk 2 are assembled after they have been faced, counterbored and shouldered adjacent to the seat groove as before described, bolted tightly together and are then bored straight through to receive upper stem 3' and lower stem 4', which are then inserted and assembled and the holes for stem bolts 122' are machined with stems 3' and 4' clamped in place in leaf 2. These bolts serve a duel purpose inasmuch as they tie the halves of disk 2 together, thus making it act as a single integral part when resisting the water load upon the disk through bending, and they likewise serve as keys to transmit the turning effort of the operating mechanism from the stem into the disk.

The lower end of stem 3' is counterbored on a taper to matingly receive the similarly tapered upper end extremity of lower stem 4', and when assembled the mating tapered surfaces of the stems are drawn tightly together, thereby securing the strength of the upper stem 3' and the lower stem 4' as a beam to resist the bending stresses imposed upon the valve in service. In the upper end face of stem 4 a hole 124 is tapped on the axial center of this part into which a lifting eye 123 may be screwed for handling purposes, and from the bottom of this tapped hole a hole of smaller diameter is drilled in continuity on the axial center of 4' to sufficient depth to communicate with hole 125 drilled at right angles to the axis of 4'. The open end of 125 is tapped to receive the similarly threaded nozzle end of a standard pressure grease-gun, which can be threadably connected thereto and grease injected under high pressure through holes 125 and 124 into the cavity between the end face at the upper tapered extremity of stem 4' and upper wall face of the cavity formed by the tapered counterbore in the lower end of 3', thus producing a force of large magnitude tending to move stem 3' axially away from stem 4' and thus separating these parts. By this arrangement ample means for forcing the upper and lower stems apart are provided, which insures easy dismantling of these parts after they have been in use for protracted periods and may have become corroded until their contact surfaces would otherwise be difficult or impossible to break asunder at the joints, and this result is secured without special or expensive equipment being required. With this arrangement, the bolts 122' are removed, the bolts clamping the halves of the leaf together loosened, the castings containing the stuffing-box and thrust bearing removed after the operating gear segment has been dismantled; the upper stem 3' is lifted vertically out of the leaf into the operating chamber, the lower stem 4' is lifted out in similar manner, and the gate leaf is taken out through the conduit as before described. Handling the stem in two pieces permits the height of the operating chamber to be reduced, thereby avoiding undue weakening of the structure within which the valve is installed.

In the foregoing descriptions of the different forms of our valve, and in the several figures, the axis of leaf rotation has been described and illustrated as being vertical, but it may, where conditions make it desirable to do so, be shifted so that the common center line of the gate stems and the axis of rotation is upon the horizontal or at appropriate angles between the vertical and the horizontal. We also wish to state that while we have not shown such construction upon the accompanying drawings, we do insert a short lining of non-corrodible metal in the interior of casting 1, and bore same to seatingly receive seat ring 70, whenever conditions are such as to make this construction desirable.

It will be obvious to those skilled in the art to which our invention relates that modifications may be made in the details of the construction of the parts and their relative arrangement without departing from the spirit of our invention or the scope of the following claims.

We claim:

1. In a butterfly valve, a casing having a stem bearing, a valve leaf, a stem carried by said leaf and journalled in said bearing, and means within said leaf for withdrawing said stem from said bearing.

2. In a butterfly valve, a casing having axially alined stem bearings, stems journalled in said bearings, a valve leaf pivotally supported on said casing by said stems, and means carried by said leaf for withdrawing said stems from said bearings.

3. In a butterfly valve, a casing having axially alined stem bores, a valve leaf having a bore therethrough, a stem mounted in each end of said bore and cooperating with said bores to provide a pivotal support for said leaf, means normally preventing axial movement of said stems, and means for moving each of said stems axially to clear said bores when said first means is rendered inoperative.

4. The invention as set forth in claim 3, in combination with a plate mounted in said bore intermediate said stems, said means for moving said stems being supported by said plate.

5. The invention as set forth in claim 3, wherein said means for effecting axial movement of said stems comprises hydraulic means constituted in part by said stems.

6. The invention as set forth in claim 3, wherein said second means includes a hydraulic jack for moving each stem, each jack having its respective stem as the hydraulic cylinder thereof, and the pistons of both stems being secured to a diaphragm plate mounted on said leaf intermediate said stems.

7. In a butterfly valve, a pair of leaf sections having semi-cylindrical walls at the inner faces thereof, said walls defining a cylindrical bore for receiving stems, a pair of stems within said bore, means locking said stems against rotation with respect to said leaf sections, and means within said bore for projecting the ends of said stems beyond the periphery of said leaf or for withdrawing said stems to positions within said bore.

8. The invention as set forth in claim 7, wherein each of said stems is hollow and forms the cylinder of a hydraulic jack, the piston for each jack is connected to the said leaf sections, and passages are provided for introducing pressure fluid into said cylinder at either side of said piston.

9. In a butterfly valve, a leaf having a stem receiving bore, a pair of stems slidably mounted in said bore, a capstan plate carried by said leaf, and a rod fixed to said plate and having oppositely threaded ends engaging threaded openings in the respective stems.

10. The invention as set forth in claim 9 wherein said stems are of different length and having correspondingly different ranges of axial movement and the pitch of the threads at opposite ends of said rod is such that a given rotation of said capstan plate moves both stems over the same fraction of its respective range of movement.

11. In a butterfly valve, a casing having axially alined bearings, a valve leaf of lenticular form comprising two sections meeting substantially on the plane of symmetry of the lenticular leaf, said sections having opposed walls at their upper and lower ends which define axially alined bearings for receiving valve stems, a stem slidably mounted in each of the bearings of said valve leaf, means for withdrawing said stems to lie within said leaf or for projecting the ends of said stems into the bearings of said casing, and means clamping said sections to each other and to said stems.

12. In a butterfly valve, a pair of substantially identical casing sections of semi-circular form, a stem boss at the center of the periphery of each casing section, a bushing in each boss, a cap closing one boss, and means carried by the other boss for packing a valve stem pivoted in and projecting through said second boss, said means comprising a casting seated on said second boss and including cylindrical shoulders entering said second boss for axially alining the bore of said casting with the bushing in said second boss.

13. The invention as set forth in claim 12, in combination with a thrust bearing casting seated on said first casting; the meeting surfaces of said castings having cylindrical shoulders for axially alining the bores of said castings.

14. In a butterfly valve, a casing having a boss providing a stem bearing, a vertical stem journalled in said boss, a valve leaf secured to said stem, a thrust bearing including a seat carried by said boss and a thrust collar threaded upon said stem, and means for temporarily locking said collar against rotation with said stem, whereby said stem may be turned within said collar to transfer the weight of said stem and leaf to said collar or to relieve said collar of their weight.

15. In a butterfly valve, a casing providing a cylindrical fluid passage and including a hollow boss at the top of said casing, a stem journalled in said boss and having a radial shoulder at its lower end, a valve leaf mounted on said stem and having a shoulder cooperating with said stem shoulder to transfer the weight of said leaf to said stem, a thrust collar threaded upon said stem, and having a recess in its outer surface, a thrust bearing carried by said boss, a dust guard secured to said boss and enclosing said thrust ring and bearing, and a bore extending through the wall of said dust guard, whereby a locking pin may be mounted in said dust guard bore and engaged in said thrust collar recess to lock said collar against rotation with said stem.

PHILLIP A. KINZIE.
JOHN L. SAVAGE.
LAUREL E. FRANCE.